(12) United States Patent
Buzzard et al.

(10) Patent No.: US 9,302,696 B2
(45) Date of Patent: Apr. 5, 2016

(54) STEERING COLUMN ENERGY ABSORPTION STRAP

(71) Applicant: STEERING SOLUTIONS IP HOLDING CORPORATION, Saginaw, MI (US)

(72) Inventors: Donald A. Buzzard, Saginaw, MI (US); Michael P. Anspaugh, Bay City, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/291,939

(22) Filed: May 30, 2014

(65) Prior Publication Data

US 2015/0128752 A1 May 14, 2015

Related U.S. Application Data

(60) Provisional application No. 61/829,670, filed on May 31, 2013.

(51) Int. Cl.
*B62D 1/19* (2006.01)
*F16F 7/12* (2006.01)

(52) U.S. Cl.
CPC ............. *B62D 1/195* (2013.01); *F16F 7/123* (2013.01); *F16F 7/128* (2013.01); *Y10T 29/49622* (2015.01)

(58) Field of Classification Search
CPC ............. F16F 7/12; F16F 7/123; F16F 7/128; B62D 1/192; B62D 1/195; B62D 1/19
USPC ............................ 280/777; 74/493; 188/374
See application file for complete search history.

(56) References Cited

U.S. PATENT DOCUMENTS

| | | | | |
|---|---|---|---|---|
| 4,989,898 | A * | 2/1991 | Yamaguchi et al. | 280/777 |
| 5,052,716 | A * | 10/1991 | Matsumoto | 280/777 |
| 5,487,562 | A * | 1/1996 | Hedderly et al. | 280/777 |
| 5,615,916 | A * | 4/1997 | Fujiu et al. | 280/777 |
| 7,490,855 | B2 * | 2/2009 | Inayoshi et al. | 280/777 |
| 8,104,841 | B2 * | 1/2012 | Malapati et al. | 297/468 |
| 2004/0232685 | A1 * | 11/2004 | Gatti et al. | 280/777 |
| 2009/0194366 | A1 * | 8/2009 | Parker et al. | 182/3 |
| 2014/0251059 | A1 * | 9/2014 | Russell et al. | 74/492 |

* cited by examiner

*Primary Examiner* — Ruth Ilan
(74) *Attorney, Agent, or Firm* — Cantor Colburn LLP

(57) ABSTRACT

An energy absorbing device for a steering column assembly includes a first end configured to couple to a first component of the steering column assembly and a second end configured to couple to a second component of the steering column. An intermediate portion extends between the first end and the second end. The intermediate portion includes a curved portion having a radius and a leg portion extending between the curved portion and the second end. The leg portion includes a plurality of localized surface features to tune a collapse characteristic of the energy absorbing device and to facilitate maintaining the radius constant when a force moves the first end relative to the second end and deforms the energy absorbing device.

12 Claims, 5 Drawing Sheets

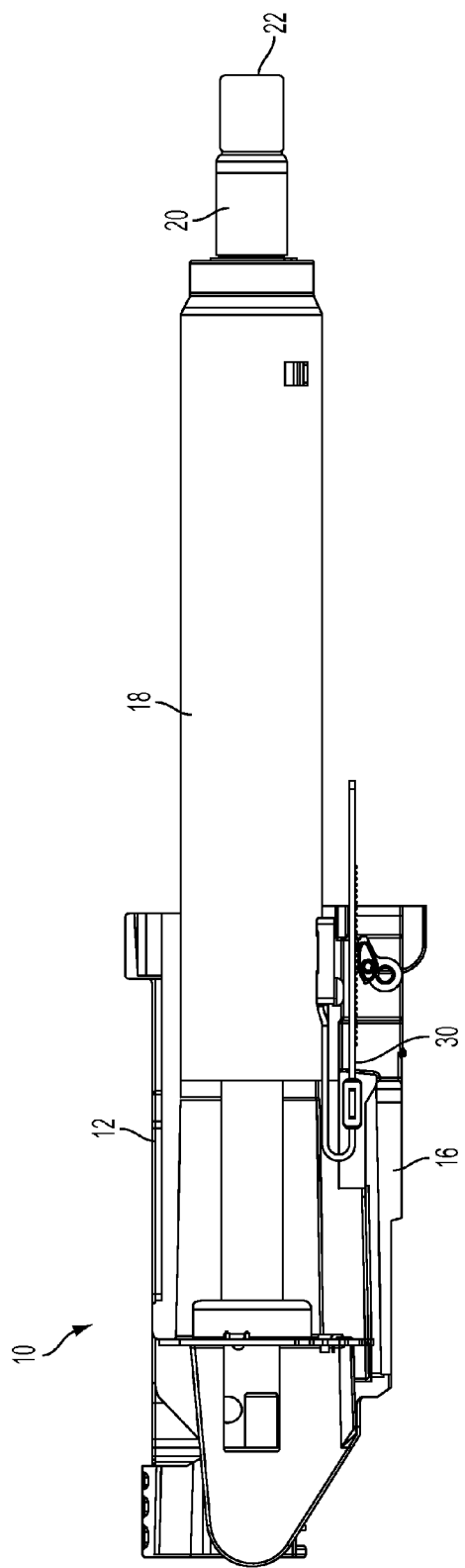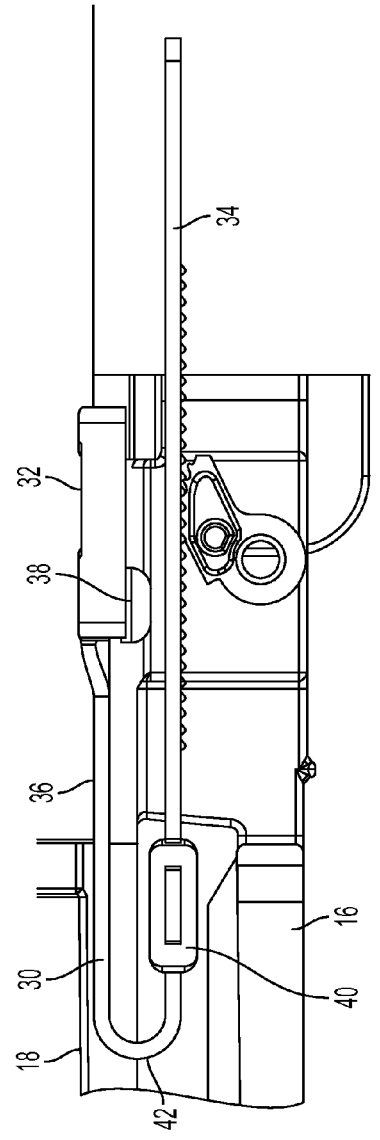

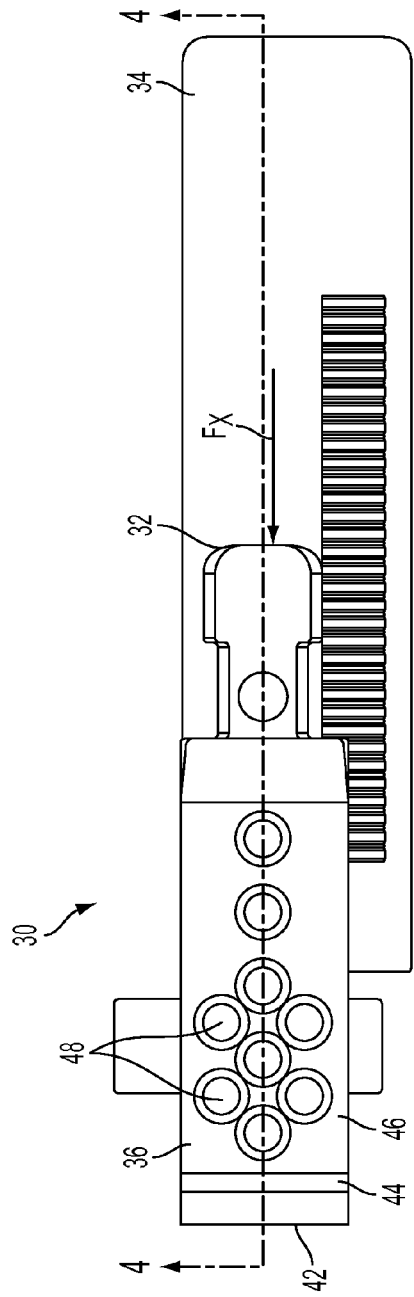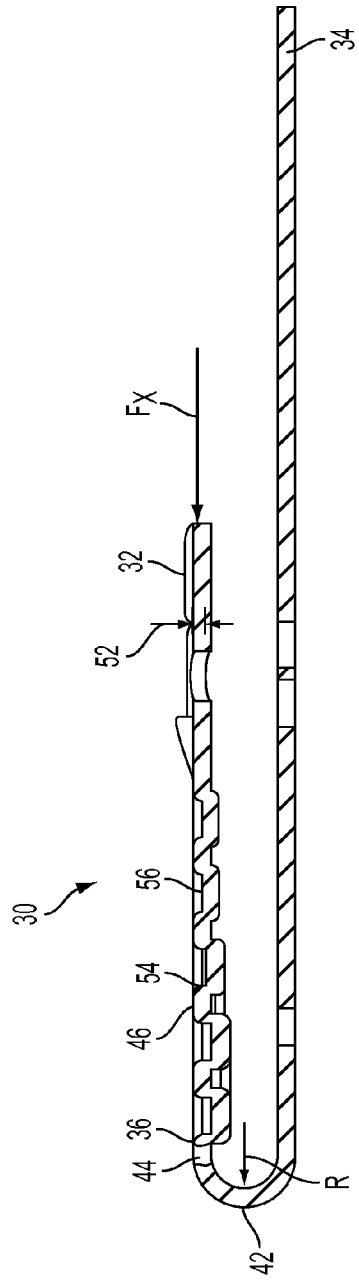

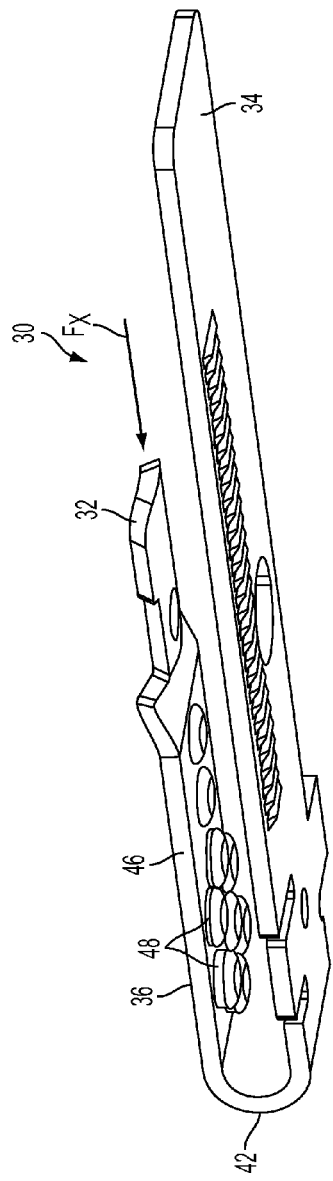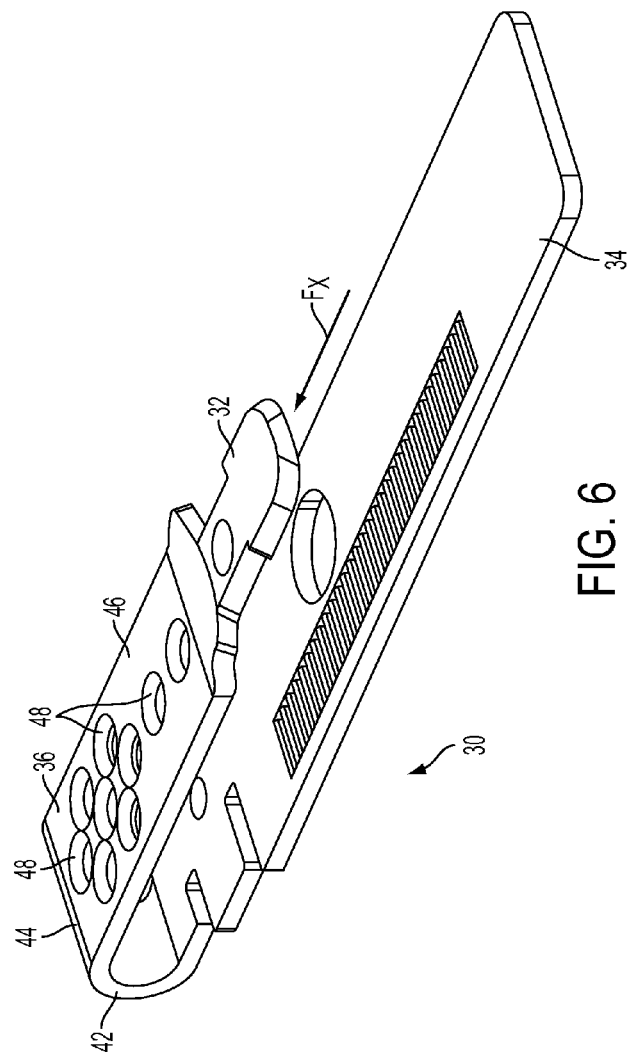

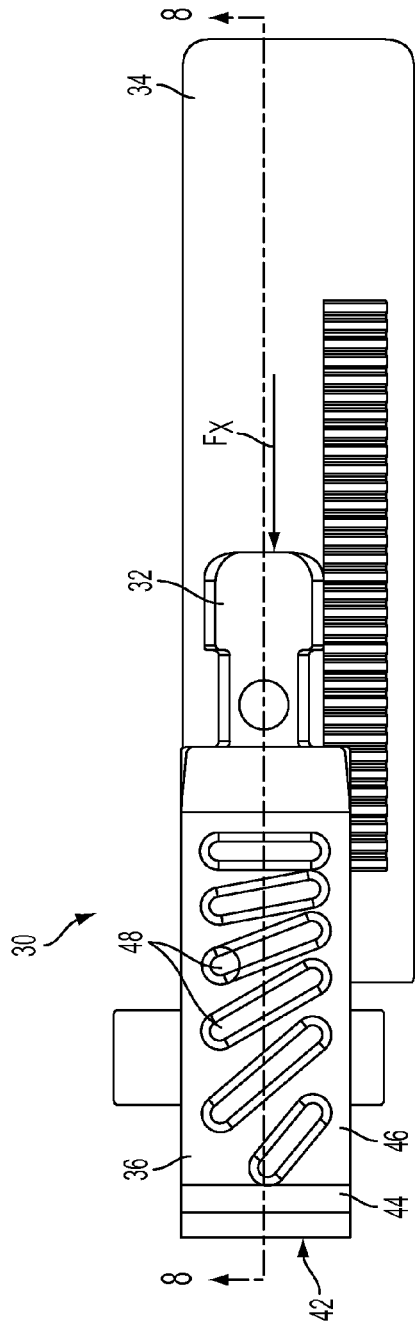
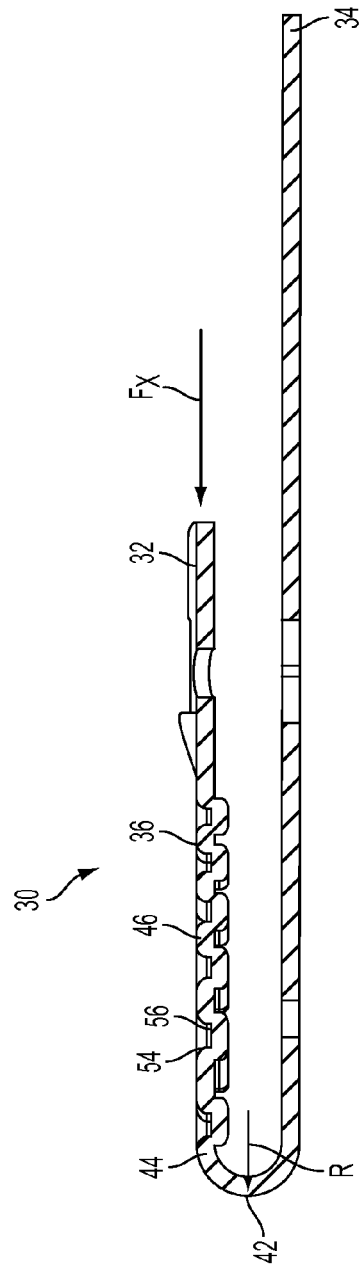
FIG. 7
FIG. 8

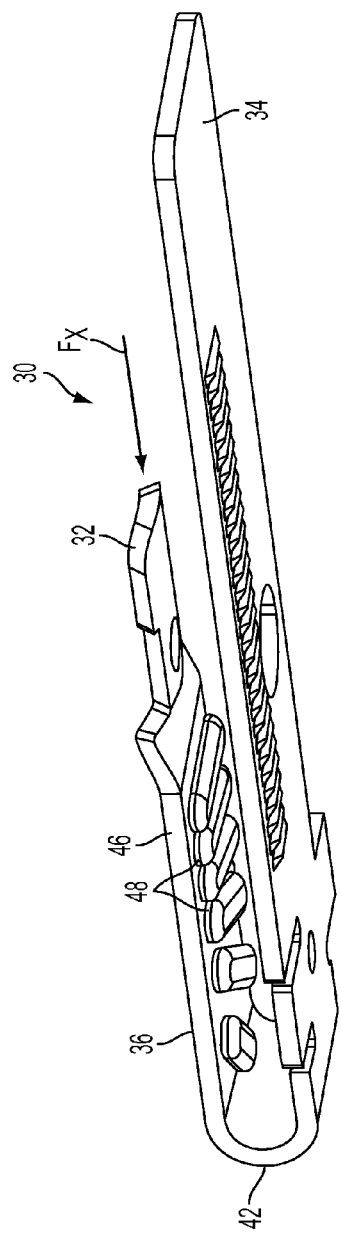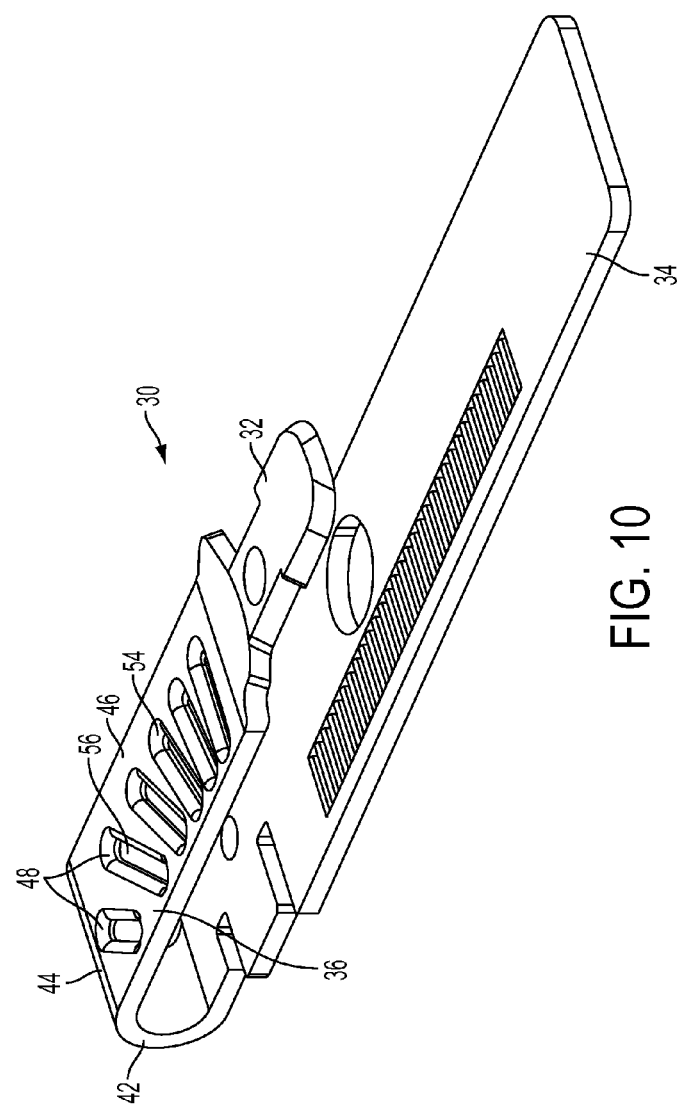

STEERING COLUMN ENERGY ABSORPTION STRAP

CROSS-REFERENCES TO RELATED APPLICATIONS

This patent application claims priority to U.S. Provisional Patent Application Ser. No. 61/829,670, filed May 31, 2013, which is incorporated herein by reference in its entirety.

FIELD OF THE INVENTION

The following description relates to energy absorbing devices, and more particularly, to an energy absorbing strap for a steering column assembly.

BACKGROUND OF THE INVENTION

Energy absorbing straps have been used as a means of absorbing energy during the collapse of a steering column. Some such straps are configured to roll along their length to absorb energy, and are often referred to as roll straps. Typically, roll straps absorb energy during the deformation of the strap in crash event. For example, a vehicle operator may contact the steering column assembly, whereby kinetic energy of the occupants may be dissipated through compression of the steering column assembly.

When designing an E/A roll strap, the considerations include: cost, load requirements, tuneability, and packaging. Performance of the roll strap in a collapse event is influenced by many factors, including material thickness/width, material properties, and or shapes or features of the strap, such as darts, flanges, gussets, and/or curvature of the strap. As such, performance of the strap can be changed by modifying these characteristics, but often packaging requirements limit the changes that can be made. In such instances, gussets are often employed, but selected gussets shapes become quite complex to fulfill specific requirements during specific stages of the collapse cycle. The complexity greatly affects manufacturing cost of the roll strap and is thus an undesired solution.

SUMMARY OF THE INVENTION

In one embodiment, an energy absorbing device for a steering column assembly includes a first end configured to couple to a first component of the steering column assembly and a second end configured to couple to a second component of the steering column. An intermediate portion extends between the first end and the second end. The intermediate portion includes a curved portion having a radius and a leg portion extending between the curved portion and the second end. The leg portion includes a plurality of localized surface features to tune a collapse characteristic of the energy absorbing device and to facilitate maintaining the radius constant when a force moves the first end relative to the second end and deforms the energy absorbing device.

In another embodiment, a steering column assembly includes a mounting bracket, a first jacket coupled to the mounting bracket and having a longitudinal axis and a second jacket slidably disposed with the first jacket for telescoping movement along the longitudinal axis relative to the first jacket. An energy absorbing strap is operably connected to the steering column assembly and includes a first end coupled to the second jacket, a second end coupled to one of the first jacket and the mounting bracket, and an intermediate portion extending between the first end and the second end. The intermediate portion includes a curved portion having a radius, and a leg portion extending between the curved portion and the second end. The leg portion includes a plurality of localized surface features to tune a collapse characteristic of the energy absorbing device and to facilitate maintaining the radius constant when a force moves the first end relative to the second end and deforms the energy absorbing device.

In yet another embodiment, a method of fabricating an energy absorbing device for a steering column assembly includes providing a strap having a first end configured to couple to a first component of the steering column, a second end configured to couple to a second component of the steering column, and an intermediate portion extending between the first and second ends. The intermediate portion includes a curved portion having a radius and a leg portion extending from the curved portion to the first end. A plurality of localized surface features are formed at the leg portion. The localized surface features are configured to tune a collapse characteristic of the energy absorbing device and to facilitate maintaining the radius constant when a force acting on the steering column first component moves the first end relative to the second end and deforms the energy absorbing device.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a cross-sectional view of an embodiment of a steering column assembly having an energy absorbing strap;

FIG. 2 is an enlarged view of a portion of the steering column assembly and energy absorbing strap shown in FIG. 1;

FIG. 3 is a plan view of an embodiment of an energy absorbing strap;

FIG. 4 is a cross-sectional view of an embodiment of an energy absorbing strap;

FIG. 5 is a perspective view of an embodiment of an energy absorbing strap;

FIG. 6 is another perspective view of an embodiment of an energy absorbing strap;

FIG. 7 is a plan view of another embodiment of an energy absorbing strap;

FIG. 8 is a cross-sectional view of the embodiment of an energy absorbing strap of FIG. 7;

FIG. 9 is a perspective view of the embodiment of an energy absorbing strap of FIGS. 7 and 8; and FIG. 10 is another perspective view of the embodiment of an energy absorbing strap of FIGS. 7-9.

DETAILED DESCRIPTION

Referring now to the Figures, where the invention will be described with reference to specific embodiments, without limiting same, FIGS. 1 and 2 show an exemplary steering column assembly 10 that includes a lower jacket 12 disposed along a longitudinal axis 14 and pivotally coupled to a mounting bracket 16, which is coupled to a host structure of a vehicle (not shown). An upper jacket 18 is arranged co-axially with lower jacket 12 and longitudinal axis 14 and is configured to translate along axis 14 relative to lower jacket 12, thereby facilitating telescoping and/or collapse motion of steering column assembly 10. A rotating inner shaft 20 is disposed co-axially within jackets 12, 18 and includes a steering wheel end 22 configured to receive a vehicle steering wheel (not shown).

With further reference to FIGS. 3-6, steering column assembly 10 includes an energy absorbing roll strap 30 that is coupled between lower jacket 12 and upper jacket 18. During a collapse event (e.g., a vehicle crash), a force 'Fx' may move or collapse upper jacket 18 along axis 14 relative to fixed mounting bracket 16, and energy absorbing strap 30 dissipates at least some of the kinetic energy of collapsing upper jacket 18.

In the exemplary embodiment, energy absorbing strap 30 includes a first end 32, a second end 34, and an intermediate portion 36 extending therebetween. First end 32 is coupled to upper jacket 18 by a fastener 38, and second end 34 is coupled to lower jacket 12 by a fastener 40. Alternatively, first and second ends 32, 34 may be coupled to their respective steering column components using any suitable method that enables assembly 10 to function as described herein. For example, first and second ends 32, 34 may be welded to upper jacket 18 and mounting bracket 16, respectively. While the energy absorbing strap 30 illustrated is C-shaped, other strap shapes are contemplated within the scope of the present disclosure. For example, in some embodiments, the strap 30 may be S-shaped.

Strap intermediate portion 36 includes a curved portion 42 having a radius 'R'. Curved portion 42 facilitates "rolling" of strap 30 during a collapse event as first end 32 moves in the direction of force 'Fx'. An initial collapse or roll area 44 is located at the transition between curved portion 42 and a leg portion 46 of intermediate portion 36. Initial collapse area 44 represents the starting roll or deformation location where the "roll" or deformation of strap 30 begins during a collapse event.

As shown, the energy absorbing strap 30 includes a plurality of dimples 48, or other localized surface features at the leg portion 46 between the first end 32 and the curved portion 42. In some embodiments, the dimples 48 are formed in the energy absorbing strap by, for example, stamping, punching or drilling. It is to be appreciated, however, that other manufacturing methods are contemplated within the present scope. In some embodiments, such as those shown in FIGS. 3-6, the dimples 48 are circular. Each dimple 48 has a sidewall 54 and a base 56. In some embodiments, the sidewall 54 is perpendicular to the base 56 such that a dimple diameter 50 is constant along a dimple depth, while in others the dimple diameter is tapered toward the base 56. The dimples 48 are arranged in a pattern, for example, rows extending along the direction of Fx. It is to be appreciated, however, that other arrangements of dimples 48 may be utilized to tune the energy absorbing strap 30 for specific applications and/or performance characteristics depending on material thickness/width and material properties of the energy absorbing strap 30. Further, in some embodiments, the dimples 48 may be through holes extending entirely through the thickness 52 of the energy absorbing strap 30, thus not having a base 56. In some embodiments, the dimples 48 may include a counterbore.

The location and pattern of dimples 48 facilitate controlling or tuning collapse characteristics of energy absorbing strap 30, which may include the position of the collapse load peak, magnitude of the peak, and amount of drop in load following the peak. Additionally, the collapse characteristics of the energy absorbing strap 30 can be tuned or adjusted by varying other attributes of the dimples 48. For example, a dimple diameter 50 or depth may be increased or decreased, and/or an amount of taper of the dimple 48 may be increased or decreased.

Accordingly, the load profile of the energy absorbing strap 30 is influenced by direct variation of parameters of the energy absorbing strap 30, and the amount of roll radius expansion is influenced after the start of collapse movement at least in part by the rigidity between applied force 'Fx' and the position of roll radius 'R' (i.e., how the strap is secured to jackets 12, 18).

In the exemplary embodiment, when a force acts upon steering column assembly 10 (e.g., an occupant impacting the steering wheel), particularly along longitudinal axis 14, upper jacket 18 is pushed toward lower jacket 12. Because strap second end 34 is coupled to a fixed component of assembly 10 or the vehicle (e.g., lower jacket 12), as upper jacket 18 is forced toward lower jacket 12, strap second end 34 is held in place while energy absorbing strap 30 is rolled in the direction of force 'Fx'. As energy absorbing strap 30 rolls, roll radius 'R' is repositioned along strap 30 and energy is absorbed by the deformation of energy absorbing strap 30. As such, upper jacket 18 at least partially collapses onto lower jacket 12, thereby dissipating the kinetic energy of an occupant or object colliding with steering column assembly 10.

Another embodiment of energy absorbing strap 30 is illustrated in FIGS. 7-10. In this embodiment, the dimples 48 are not circular, but are elongated, having, for example, an oval or racetrack shape. Each elongated dimple 48 has a sidewall 54 and a base 56. In some embodiments, the sidewall 54 is perpendicular to the base 56 such that a dimple shape is constant along its depth, while in others the dimple shape is tapered toward the base 56. The elongated dimples 48 are arranged in a pattern, for example, a fan type pattern along the leg portion 46. It is to be appreciated, however, that other arrangements of dimples 48 may be utilized to tune the energy absorbing strap 30 for specific applications and/or performance characteristics. Further, in some embodiments, the elongated dimples 48 may extend entirely through the strap thickness 52, resulting in a plurality of slots in the leg portion 56. Further, a depth of the elongated dimples 48 may be varied, and the elongated dimples 48 may be utilized in combination with the circular dimples 48 of FIGS. 3-6 and/or used in conjunction with other features or shapes to tune performance of the energy absorbing strap 30.

While energy absorbing straps 30 are described coupled to specific components of a steering column assembly, it should be noted that an energy absorbing strap according to the present invention can have various configurations and will function as described herein when one strap end is coupled to a fixed portion of a vehicle/column (e.g., a vehicle cross-car beam) and the other strap end is coupled to a steering column component that moves during a collapse event (e.g., an upper jacket).

Systems and methods to control and tune collapse characteristics of energy absorbing straps are described herein. By adding dimples 48 to the energy absorbing strap 30 and varying their position and/or other characteristics, the energy absorbing strap 30 energy absorbing load profile can be purposefully influenced. Various dimple 48 cross-sectional geometries and arrangements can be implemented between the applied force 'Fx' and the roll radius 'R'.

Benefits of these exemplary embodiments of the invention include increased flexibility in the energy absorbing load curve control for roll strap designs. There are various further benefits to the energy absorbing straps 30 of the present disclosure. These include no additional cost, as no additional parts are required. In addition, there is little or no additional material required. Finally, tooling to create the tunable energy absorbing strap 30 may be modularized.

Other benefits include the ability to change and/or tune the existing geometry of a specific energy absorbing strap 30 for different load requirements. Specific load requirements may be satisfied by creating dense deep dimples 48 where required, and/or sparse shallow dimples 48 in other areas. A variety of shapes and sizes of dimples 48, holes, or the like may be incorporated to achieve desired results. It is realized that shapes may be combined and or overlapped. Furthermore, exemplary embodiments of the invention allow tenability without changing packaging constraints within the vehicle, as the energy absorbing strap 30 will fit within the same space.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. An energy absorbing device for a steering column assembly, comprising:
    a first end configured to couple to a first component of the steering column assembly;
    a second end configured to couple to a second component of the steering column; and
    an intermediate portion extending between the first end and the second end, the intermediate portion including a curved portion having a radius, and a leg portion extending between the curved portion and the second end, the leg portion including a plurality of dimples to tune a collapse characteristic of the energy absorbing device and to facilitate maintaining the radius constant when a force moves the first end relative to the second end and deforms the energy absorbing device, the plurality of dimples are arranged non-symmetrically about a longitudinally-extending center axis of the intermediate portion.

2. The device of claim 1, wherein the plurality of dimples are tapered along their depth.

3. The device of claim 1, wherein the plurality of dimples vary in depth.

4. The device of claim 1, wherein the plurality of dimples are elongated.

5. The device of claim 1, wherein the plurality of dimples are elongated across a width of the leg portion, each dimple of the plurality of dimples having a first end located at a first lateral side of the leg portion and a second end located at a second lateral side of the leg portion, a dimple spacing between a first dimple of the plurality of dimples and a second dimple adjacent to the first dimple is greater at the second end than at the first end.

6. A steering column assembly comprising:
    a mounting bracket;
    a first jacket coupled to the mounting bracket and having a longitudinal axis;
    a second jacket slidably disposed with the first jacket for telescoping movement along the longitudinal axis relative to the first jacket; and
    an energy absorbing strap including:
    a first end coupled to the second jacket;
    a second end coupled to one of the first jacket and the mounting bracket; and
    an intermediate portion extending between the first end and the second end, the intermediate portion including a curved portion having a radius, and a leg portion extending between the curved portion and the first end, the leg portion including a plurality of dimples to tune a collapse characteristic of the energy absorbing device and to facilitate maintaining the radius constant when a force moves the first end relative to the second end and deforms the energy absorbing device, the plurality of dimples are arranged non-symmetrically about a longitudinally-extending center axis of the intermediate portion.

7. The steering column assembly of claim 6, wherein the plurality of dimples are tapered along their depth.

8. The steering column assembly of claim 6, wherein the plurality of dimples vary in depth.

9. The steering column assembly of claim 6, wherein the plurality of dimples are elongated.

10. The steering column assembly of claim 6, wherein the plurality of dimples are elongated across a width of the leg portion, each dimple of the plurality of dimples having a first end located at a first lateral side of the leg portion and a second end located at a second lateral side of the leg portion, a dimple spacing between a first dimple of the plurality of dimples and a second dimple adjacent to the first dimple is greater at the second end than at the first end.

11. A method of fabricating an energy absorbing device for a steering column assembly, the method comprising:
    providing a strap having a first end configured to couple to a first component of the steering column, a second end configured to couple to a second component of the steering column, and an intermediate portion extending between the first and second ends, wherein the intermediate portion includes a curved portion having a radius and a leg portion extending from the curved portion to the first end; and
    forming a plurality of dimples at the leg portion, the localized surface features configured to tune a collapse characteristic of the energy absorbing device and to facilitate maintaining the radius constant when a force acting on the steering column first component moves the first end relative to the second end and deforms the energy absorbing device, the plurality of dimples are arranged non-symmetrically about a longitudinally-extending center axis of the intermediate portion.

12. The method of claim 11, wherein the plurality of dimples are formed via one of stamping, punching or drilling.

* * * * *